(12) United States Patent
Singh

(10) Patent No.: US 8,954,833 B2
(45) Date of Patent: Feb. 10, 2015

(54) HALF WIDTH COUNTING LEADING ZERO CIRCUIT USING COMPARATORS

(75) Inventor: Deepak K. Singh, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 233 days.

(21) Appl. No.: 13/489,551

(22) Filed: Jun. 6, 2012

(65) Prior Publication Data

US 2013/0332788 A1    Dec. 12, 2013

(51) Int. Cl.
*G06F 3/048*    (2013.01)

(52) U.S. Cl.
USPC ......................................................... 714/819

(58) Field of Classification Search
CPC ......... G06F 7/485; G06F 7/74; G06F 7/5095; G06F 7/026; G06F 11/10; G01R 31/31703; G01R 31/3183; H04B 17/0085; G11C 2211/5642; G11C 29/00; H04L 25/14; B62D 1/28; H04W 88/08
USPC .......... 714/E11.032, 746, 819, 724, 704, 715; 708/505, 211, 670; 340/146.2
See application file for complete search history.

(56) References Cited

U.S. PATENT DOCUMENTS

| | | | |
|---|---|---|---|
| 5,111,415 A | | 5/1992 | Shackleford |
| 5,204,825 A | | 4/1993 | Ng |
| 5,241,490 A | * | 8/1993 | Poon .............................. 708/205 |
| 5,568,412 A | * | 10/1996 | Han et al. ....................... 708/497 |
| 5,844,826 A | * | 12/1998 | Nguyen ......................... 708/211 |
| 5,943,520 A | | 8/1999 | Komatsuzaki et al. |
| 5,974,432 A | * | 10/1999 | Orup ............................. 708/205 |
| 6,173,300 B1 | | 1/2001 | Mahurin |
| 7,024,439 B2 | * | 4/2006 | Hoskote ......................... 708/211 |
| 7,272,097 B2 | * | 9/2007 | Ren .............................. 369/59.23 |
| 8,005,880 B2 | * | 8/2011 | Singh et al. .................... 708/210 |

OTHER PUBLICATIONS

Schmookler and Nowka, Leading Zero Anticipation and Detection—A Comparison of Methods. IBM Server Development and IBM Austin Research Laboratory, Austin, TX.

* cited by examiner

*Primary Examiner* — Phung M Chung
(74) *Attorney, Agent, or Firm* — H. Daniel Schnurmann; Arnold Bangali

(57) ABSTRACT

An approach for determining a value representing the number of leading zero count value in a binary input data word, is described. The binary input data word contains random data. The binary input data word is logically divided into odd and even bit positions. The approach includes a first comparator circuit for comparing data in the odd bit positions to data in the even bit positions. The approach further includes a second comparator circuit for comparing the data in the odd bit positions to a result of a logical operation performed on the data in the odd and even bit positions. The approach further includes a half-width leading zero counting circuit that provides a value representing the number of leading zero bits in the binary input data word.

12 Claims, 9 Drawing Sheets

FIG. 2F

| | | | | | | | | | | | | | | | |
|---|---|---|---|---|---|---|---|---|---|---|---|---|---|---|---|
| 208 → | N-1 | N-3 | N-5 | N-7 | N-9 | | | | | | | | | 3 | 1 |
| 206 → | 0 | 0 | 0 | 1 | 0 | x | x | x | x | x | x | x | x | x | x |
| 202 → | 0 | 0 | 0 | 1 | 1 | x | x | x | x | x | x | x | x | x | x |
| 204 → | N-2 | N-4 | N-6 | N-8 | N-10 | | | | | | | | | 2 | 0 |

| | | | | | | | | | | | | | | | |
|---|---|---|---|---|---|---|---|---|---|---|---|---|---|---|---|
| 212 → | 0 | 0 | 0 | 0 | 1 | x | x | x | x | x | x | x | x | x | x |

FIG. 2G

| | | | | | | | | | | | | | | | |
|---|---|---|---|---|---|---|---|---|---|---|---|---|---|---|---|
| 208 → | N-1 | N-3 | N-5 | N-7 | N-9 | | | | | | | | | 3 | 1 |
| 206 → | 0 | 0 | 0 | 1 | 1 | x | x | x | x | x | x | x | x | x | x |
| 202 → | 0 | 0 | 0 | 0 | 1 | x | x | x | x | x | x | x | x | x | x |
| 204 → | N-2 | N-4 | N-6 | N-8 | N-10 | | | | | | | | | 2 | 0 |

| | | | | | | | | | | | | | | | |
|---|---|---|---|---|---|---|---|---|---|---|---|---|---|---|---|
| 102 → | N-1 | N-2 | N-3 | | | | | | | | | | | 1 | 0 |
| 104 → | 0 | 0 | 0 | 0 | 0 | 1 | 0 | 1 | 1 | x | x | x | x | x | x |

HALF WIDTH COUNTING LEADING ZERO CIRCUIT USING COMPARATORS

TECHNICAL FIELD

The present invention relates generally to a circuit and method for providing a numeric indication of the number of leading zeros in a binary data word and more specifically to a more efficient circuit and method for providing a leading zeros count using comparators.

BACKGROUND

Modern data processing systems use binary numbers for the computation of data. This computation includes both integer arithmetic and floating-point arithmetic. Floating point arithmetic, used in addition, multiplication, and division, first normalizes the binary numbers to be added, multiplied, or divided by shifting the binary numbers until the first non-zero digit (i.e. 1) is immediately to the left of the radix point such that the mantissa part of binary numbers will be greater than or equal to 1 and less than 2. For multiplication the normalized binary numbers are then multiplied and their exponents added. For division, the normalized binary numbers are divided and their exponents subtracted.

To normalize a binary number, the number of leading zeros (i.e., the number of zeros to the left of the first 1 in the binary number) should be quickly determined so that the number of shifts of the binary number can be quickly performed. Floating point multiplication and division calculations are typically reiterative and, thus, for a single multiplication or division calculation, the leading zeros at each step in the reiterative process should be calculated. Hence, any delays in counting these leading zeros are accumulated many times during a single multiplication or division calculation.

It is known that special count leading zero (CLZ) circuits are provided as part of the microprocessor for counting or detecting leading zeros within a binary number. It is also well known that speed and circuit size are two critical parameters in the design of any microprocessor. Often, these two parameters are mutually exclusive in that a faster microprocessor or components thereof operate faster when employing large complex circuitry but which have the disadvantage of occupying a large area within the integrated circuit. Prior art circuits for detecting or counting leading zeros within binary numbers are subject to this principle.

It would therefore be desirable to produce a count leading zero circuit that achieves a significant reduction in the number of clock cycles required to produce a leading zero count and that also decreases the amount of area required to implement the circuit.

SUMMARY

In one aspect, an embodiment of the present invention provides a logic circuit for generating an output data word representing a number of leading zeros in an input data word. The input data word includes a first and a second group of bit positions.

In another aspect, an embodiment of the present invention provides a logic circuit which includes a latch having N bits of a data word in N bit positions including a first and a second group of bit positions. The logic circuit further includes a first comparator circuit comparing data in the first group of bit positions to data in the second group of bit positions and generating a first determination value. The logic circuit further includes a second comparator circuit comparing the data in the second group of bit positions to a result of a first logical operation performed on the data in the first group of bit positions and the data in the second group of bit positions. The second comparator circuit generates a second determination value. The logic circuit further includes one leading zero counting circuit performing a leading zero count on a result of a second logical operation performed on the data in the first group of bit positions and the data in the second group of bit positions. The leading zero counting circuit generates a leading zero count value. The logic circuit further includes a logic gate operable to receive the first determination value and the second determination value. The logic gate generates a single bit correction value. The count leading zero circuit provides most significant bit positions and the correction value provides a least significant bit position of the leading zero count value. The input data word may contain random data.

In yet another aspect, an embodiment of the present invention provides a logic circuit which includes one count leading zero circuit operable to generate an additional output signal responsive to the input data word having all zero bits.

In a further aspect, an embodiment of the present invention provides a method of providing a numeric value representing the number of leading zero bits in the input data word using one count leading zero circuit and two arithmetic comparators circuits. The method includes, using a computer, storing the data word in a latch having N bits in N bit positions. The method further includes dividing the N bit positions into a first and a second group of bit positions. The method further includes generating a first determination value in response to a first comparison of data in the first group of bit positions to data in the second group of bit positions. The method further includes generating a second determination value in response to a second comparison of the data in the second group of bit positions to a result of a first logical operation performed on the data in the first group of bit positions and the data in the second group of bit positions. The method further includes counting the number of leading zero bits in a result of a second logical operation performed on the data in the first group of bit positions and the data in the second group of bit positions. The method further includes providing a correction bit by logically combining the first determination value and the second determination value. The method further includes concatenating the correction bit to the counted number of leading zero bits to provide the numeric value representing the number of leading zero bits in the data word.

BRIEF DESCRIPTION OF THE SEVERAL VIEWS OF THE DRAWINGS

FIGS. 2A-2G are schematic diagrams illustrating a logical separation of the digital data word into even-numbered and odd-numbered bits and a method of utilizing logical operations to reduce the number of logic levels in the CLZ circuit of FIG. 8, in accordance with an embodiment of the present invention.

DETAILED DESCRIPTION

Detailed embodiments of the methods and structures of the present invention are described herein; however, it is to be understood that the disclosed embodiments are merely illustrative of the described methods and structures that can be embodied in various forms. In addition, each of the examples given in connection with the various embodiments of the invention is intended to be illustrative, and not restrictive. Further, the Figures are not necessarily to scale, some features can be exaggerated to show details of particular components. Therefore, specific structural and functional details disclosed herein are not to be interpreted as limiting, but merely as a representative basis for teaching one skilled in the art to variously employ the methods and structures of the present invention.

An embodiment of the present invention relates to an improved circuit and method of counting leading zeros within a binary number. Advantageously, an embodiment of the present invention provides for an improved way to perform the count leading zero function more efficiently by using arithmetic logic, bitwise compression and only one N/2 bit wide count leading zero circuit to reduce the levels of logic needed in the circuitry to perform a CLZ operation. According to an aspect of the invention, the circuit presented in various embodiments of the invention works with random input data (i.e. there is no relationship between adjacent bits in the input data). Accordingly, the CLZ circuit of an embodiment of the present invention does not require any bit correction circuitry to perform the CLZ operation.

According to an embodiment of the present invention, the CLZ circuit parses and analyzes the input data to detect the number of leading 0s. The N bit wide digital data is supplied as an input, where N is greater than 1 and N is an even number. The input digital data may be stored in a latch. According to an embodiment of the present invention, the CLZ circuit evaluates the input digital data and computes a numeric indication of the number of leading zeros in the input data word when scanning the input word from the most significant bit (MSB) towards the least significant bit (LSB). The term "MSB" as used herein is intended to include the bit which is programmed first. The term "LSB" as used herein is intended to include the bit which is programmed last.

Figure 1:
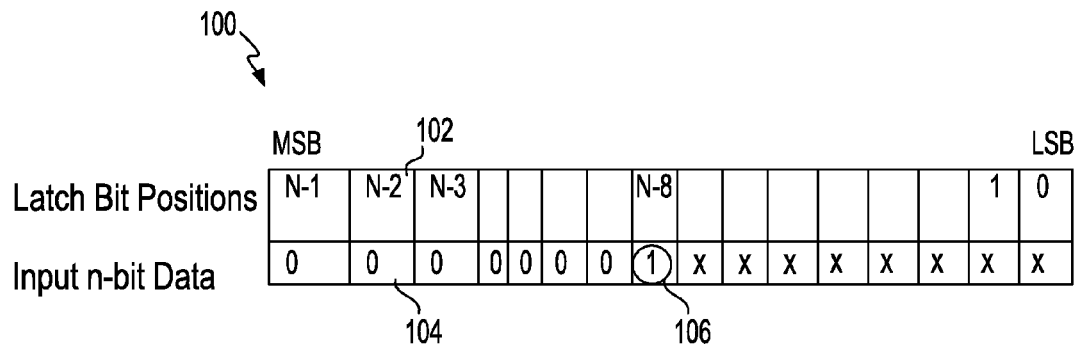
FIG. 1 is a schematic diagram of a conventional digital data word of N bits.

FIG. 1 is a diagram illustrating the data contents of a conventional N-bit wide input data latch 100. This diagram includes bit positions 102 from position 0 (the LSB position) to position N−1 (the MSB position). FIG. 1 also includes an example of typical data 104 showing 1s and 0s and would be a typical input data word. It should be noted that in the example illustrated in FIG. 1, location N−8 contains the first set (i.e. non-zero) bit 106.

In one embodiment, the CLZ logic starts with a logic separation of latch bit positions 102 into odd-bit positions and even-bit positions. For the purposes of the present description, if an N-bit data value is expressed by bits N−1 to 0, then the even bit positions are bits $0, 2, 4, \ldots, N-2$ and the odd bit positions are bits $1, 3, 5, \ldots, N-1$. It should be noted that for the purposes of the present description all possible input data values contained in input data latch 100 could be reduced to three different cases. In the first case the number of leading zeros in the odd bit positions equals the number of leading zeros in the even bit positions. In the second case the number of leading zeros in the odd bit positions is greater than the number of leading zeros in the even bit positions. In the third case the number of leading zeros in the odd bit positions is less than the number of leading zeros in the even bit positions. The first case includes 3 sub-cases that are discussed below in conjunction with FIGS. 2A-2C.

Figure 2A:
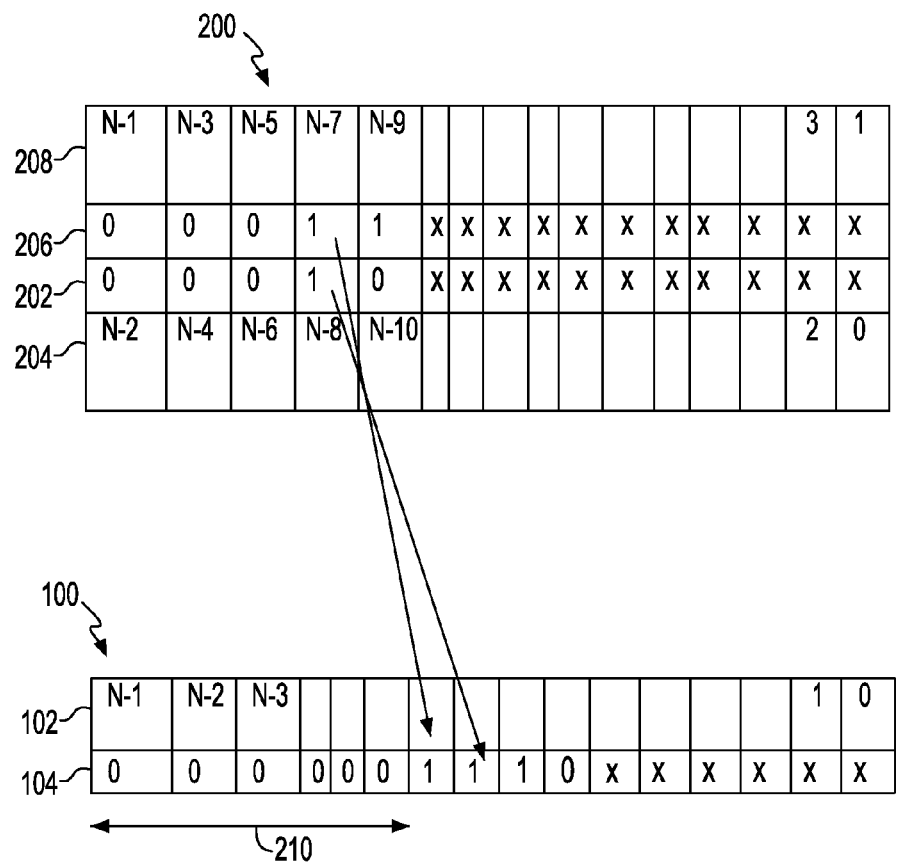

FIG. 2A illustrates a case where the number of leading zeros in the odd bit positions equals the number of leading zeros in the even bit positions and the logical value of the data contained in the odd bit positions is greater than the logical value of the data contained in the even bit positions. For illustration purposes table 200 in FIGS. 2A-3C shows the data content 104 of input data latch 100 divided into data content 202 contained in the even bit positions 204 and data content 206 contained in the odd bit positions 208. As shown in FIG. 2A there are three leading zeros in the even and odd bit positions. However, data content 202 is not equal to data content 206 because bit position N−9 contains logical value 1 and bit position N−10 contains logical value 0. Therefore, the logical value of the data contained in the odd bit positions is greater than the logical value of the data contained in the even bit positions. As illustrated in FIG. 2A, in this case the total number of leading zeros 210 can be calculated by counting the total number of leading zeros in odd bit positions 208 and multiplying the result by two, i.e.

If Odd>Even then $$CLZ = 2*OLZ \quad (1)$$

In the formulas (1)-(6) Odd represents the data contained in the odd bit positions, Even represents the data contained in the even bit positions, OLZ represents the number of leading 0s for odd bits, and ELZ represents the number of leading 0s for even bits. As can be seen from the formula (1), there is no need to count the number of leading 0s for even numbered bit positions.

Figure 2B:
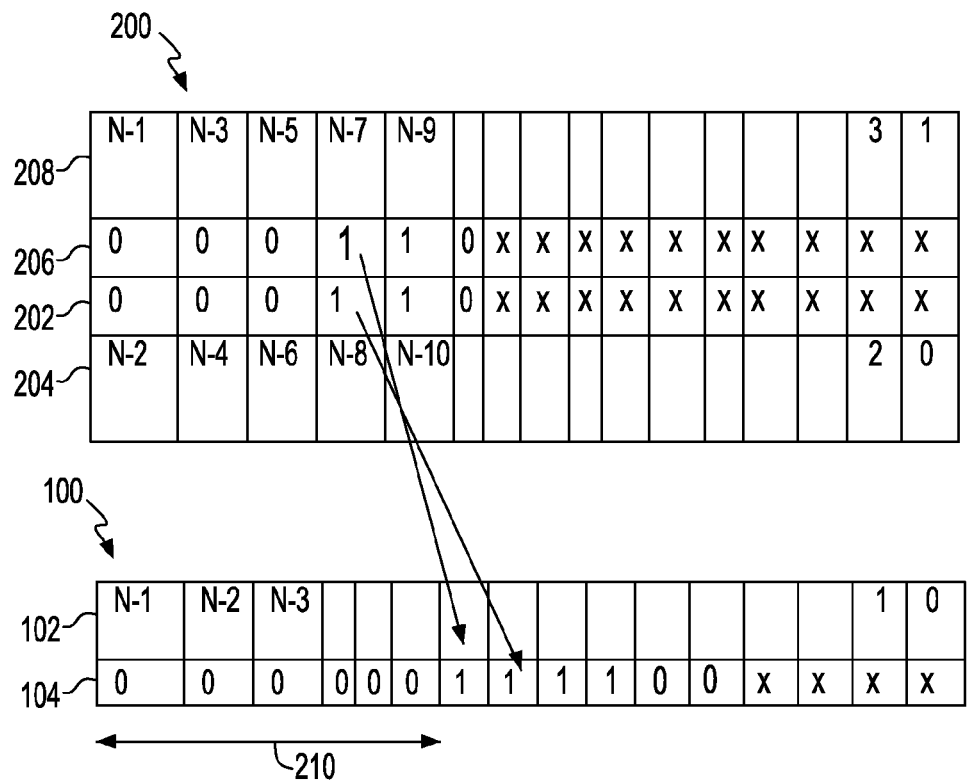

FIG. 2B illustrates a case where the number of leading zeros in the odd bit positions equals the number of leading zeros in the even bit positions and the logical value of the data contained in the odd bit positions is equal to the logical value of the data contained in the even bit positions. As shown in FIG. 2B there are three leading zeros in the even and odd bit positions. Furthermore, data content 202 is equal to data content 206 because all corresponding bits are equal (i.e. N−7=N−8, N−9=N−10, etc.). Therefore, the logical value of the data 206 contained in the odd bit positions 208 is equal to the logical value of the data 202 contained in the even bit positions 204. As illustrated in FIG. 2B, in this case the total number of leading zeros 210 can be calculated using formula (1), i.e.

If Odd=Even then $$CLZ = 2*OLZ \quad (1)$$

It is possible to combine the foregoing cases, i.e.

If Odd>=Even then $$CLZ = 2*OLZ \quad (1)$$

In accordance with an embodiment of the present invention, first comparator 500 (discussed below in conjunction with FIG. 5) may be utilized to determine if odd bits content (logical value) is greater than or equal to even bits content (logical value).

Figure 2C:
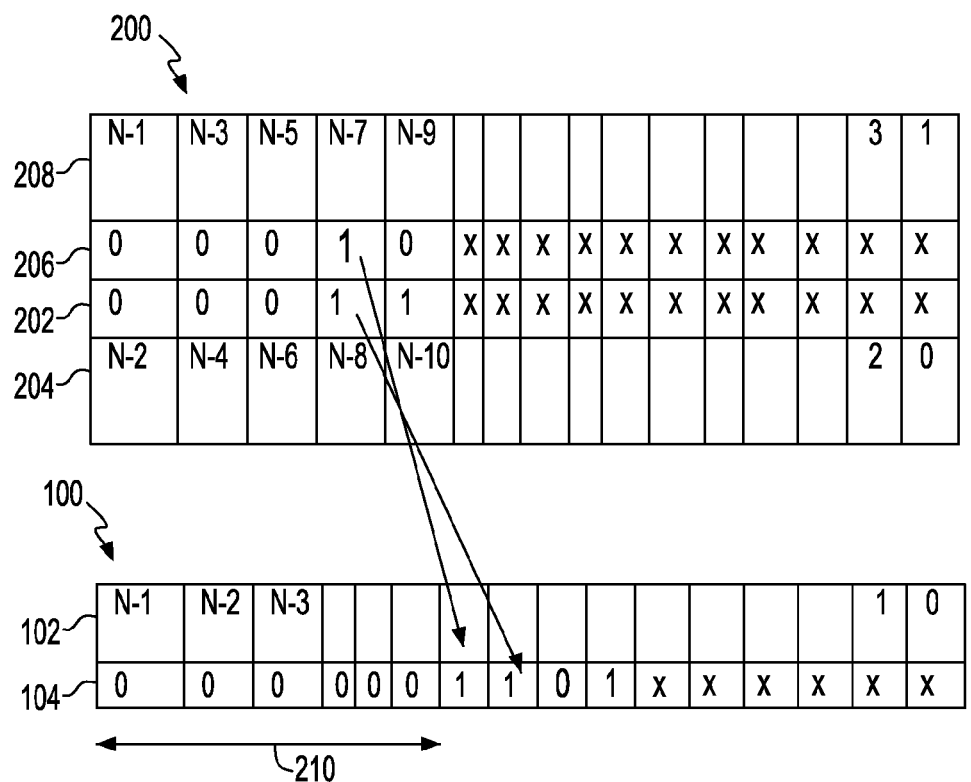

FIG. 2C illustrates a case where the number of leading zeros in the odd bit positions equals the number of leading zeros in the even bit positions but the logical value of the data contained in the odd bit positions is less than the logical value of the data contained in the even bit positions. As shown in FIG. 2C there are three leading zeros in the even and odd bit positions. However, data content 202 is not equal to data content 206 because bit position N−9 contains logical value 0 and bit position N−10 contains logical value 1. Therefore, the logical value of the data 206 contained in the odd bit positions 208 is less than the logical value of the data 202 contained in the even bit positions 204. It should be noted that in this case a comparison of data content 202 and data content 206 is not sufficient, because corresponding numbers of leading zeros may be different. Thus, in this case to compute the total number of leading zeros in input data 104 two different conditions should be checked. First condition is whether the logical value of the data contained in the odd bit positions is less than the logical value of the data contained in the even bit positions, which could be implemented using another comparator. Second condition is whether the number of leading 0s is the same for both odd bit positions and even bit positions. Typically, the second condition could be implemented using two different CLZ circuits. For example, a first CLZ circuit could compute the number of leading zeros in the even bit positions and a second CLZ could compute the number of leading zeros in the odd bit positions. The second condition would be satisfied if both CLZs generate equal outputs. However, in accordance with an embodiment of the present invention, there is another approach for determining if the second condition is true without using two different CLZ circuits.

Figure 2D:
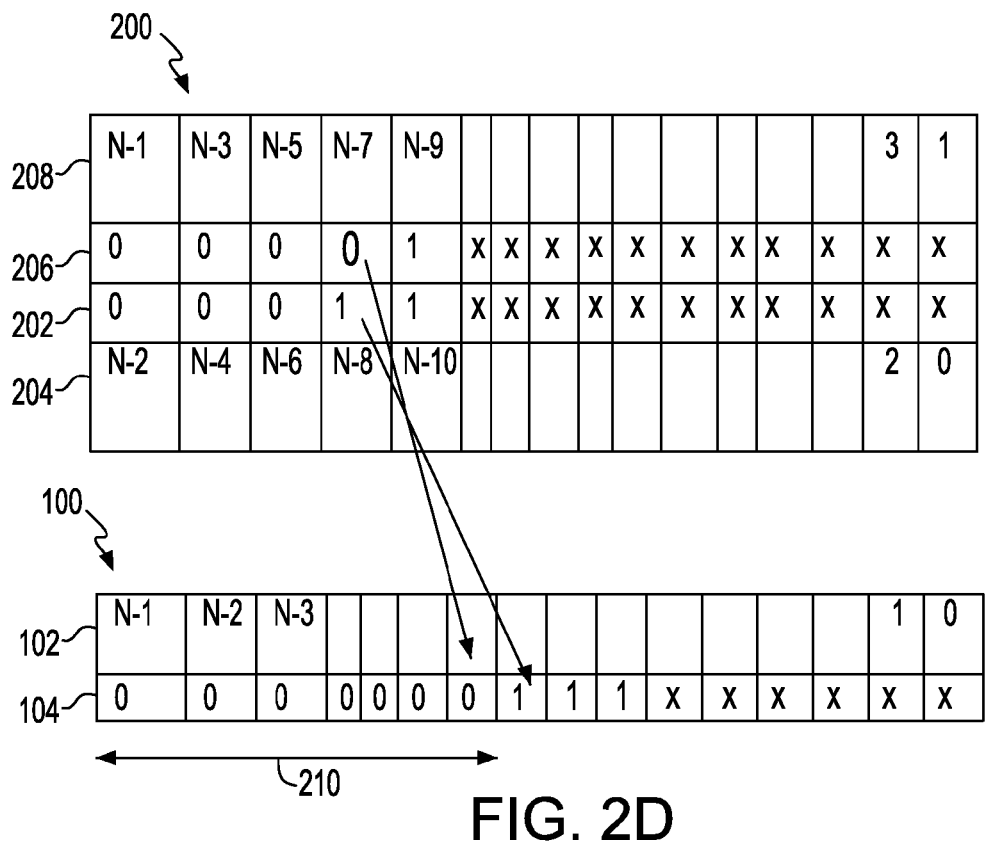

FIG. 2D illustrates a case where the number of leading zeros in the even bit positions is less than the number of leading zeros in the odd bit positions and the logical value of the data contained in the odd bit positions is less than the logical value of the data contained in the even bit positions. As shown in FIG. 2D there are three leading zeros in the data 202 contained in the even bit positions 204, but there are four leading zeros in the data 206 contained in the odd bit positions 208. In this case, the total number of leading zeros 210 can be calculated by counting the total number of leading zeros in the even bit positions 204, multiplying the result by two and adding one, i.e. 2*3+1=7 leading zeros. While a comparator circuit may be used to determine whether data content 206 contained in the odd bit positions 208 is less than data content 202 contained in the even bit positions 204, such comparator circuit is not capable of determining if the number of leading zeros in the even bit positions is equal to the number of leading zeros in the odd bit positions.

Figure 2E:
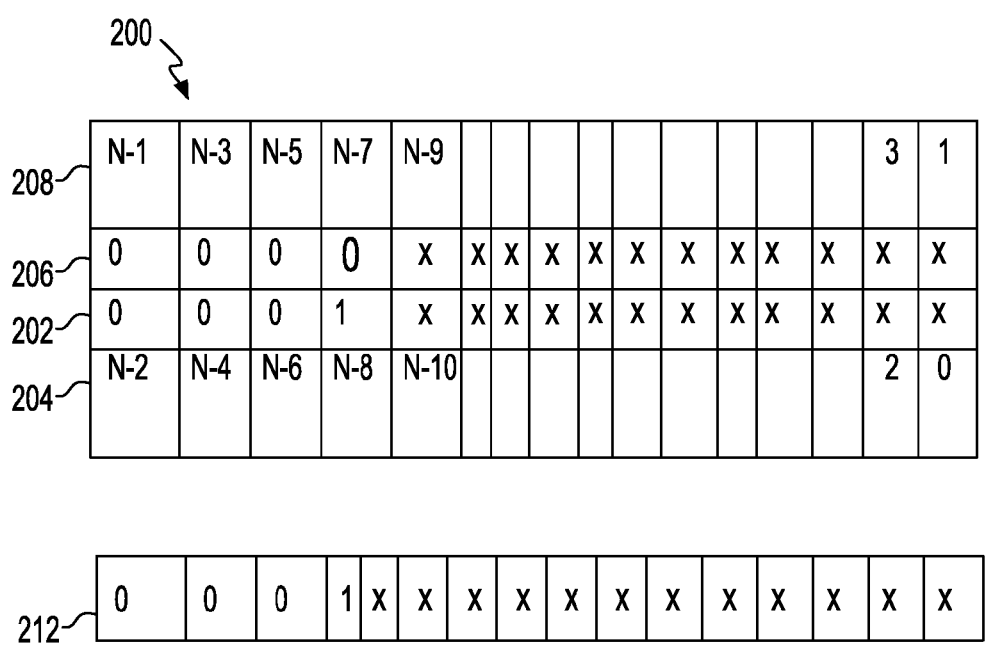

In accordance with an embodiment of the present invention, the second comparator may be operable to receive one input from a plurality of XOR logic gates (discussed below in conjunction with FIG. 4) that may perform a bitwise logical XOR operation based on corresponding bits of the even bit positions 204 and odd bit positions 208. In accordance with an embodiment of the present invention, result 212 of the logical XOR operation, as illustrated in FIG. 2E, may further be compared with data content 206 contained in the odd bit positions 208. It should be noted that data content 202 contained in the even bit positions 204 may have a smaller number of leading zeros than data content 206 contained in the odd bit positions 208 if and only if result 212 of the logical XOR operation is greater than data content 206 contained in the odd bit positions 208. Therefore, if (Odd^Even)>Odd, the following formula may be used to calculate CLZ:

$$CLZ = 2*ELZ + 1 \qquad (2)$$

FIG. 2F illustrates another case where the logical value of the data 206 contained in the odd bit positions 208 is less than the logical value of the data 202 contained in the even bit positions 204. Furthermore, in this case, result 212 of the logical XOR operation is less than data content 206 contained in the odd bit positions 208, which means that the numbers of leading zeros in the even bit positions 204 and odd bit positions 208 are equal. Thus, if (Odd^Even)<Odd, formula (1) may be used to calculate CLZ.

FIG. 2G illustrates yet another case where the number of leading zeros in the odd bit positions is less than the number of leading zeros in the even bit positions and the logical value of the data contained in the odd bit positions is greater than the logical value of the data contained in the even bit positions. As shown in FIG. 2G there are three leading zeros in the odd bit positions. In this case the total number of leading zeros 210 can be calculated using formula (1).

To summarize, in accordance with an embodiment of the present invention, the total number of leading zeros in the input data can be calculated by counting leading zeros in the odd or even bit positions only. Formula (1) represents all of the above cases except the case described in conjunction with FIGS. 2D and 2E (where the number of leading zeros in the even bit positions is less than the number of leading zeros in the odd bit positions and the logical value of the data contained in the odd bit positions is less than the logical value of the data contained in the even bit positions). For this exceptional case formula (2) may be used to calculate the CLZ. It should be noted that formula (1) also represents the case where the numbers of leading zeros in the even and odd bit positions are equal and the logical value of the data contained in the odd bit positions is less than the logical value of the data contained in the even bit positions, i.e.

$$NOT(Odd >= Even) \&\& (Odd\char`\^Even) < Odd \qquad (3)$$

Based on the foregoing description, a number of leading zeros can be determined by the following formula:

$$CLZ = (Odd >= Even) || NOT((Odd\char`\^Even) \&\& ((Odd\char`\^Even) < Odd))?2*OLZ:2*ELZ + 1 \qquad (4)$$

Using logical identity relation, i.e. (x+NOT(x)&&y))=x+y, logical formula (4) can be reduced to the following:

$$CLZ = (Odd >= Even) || ((Odd\char`\^Even) < Odd))?2*OLZ: 2*ELZ + 1 \qquad (5)$$

The general formula (5) may be implemented using two comparator circuits, where a first comparator circuit determines whether Odd>=Even and a second comparator circuit determines whether (Odd^Even)<Odd, and two CLZ circuits, where a first CLZ circuit calculates the number of leading zeros in odd bit positions and a second CLZ circuit calculates the number of leading zeros in the even bit positions. However, according to an embodiment of the present invention one CLZ circuit may be eliminated in favor of additional bitwise operation with respect to even and odd bit positions.

Figure 3A:
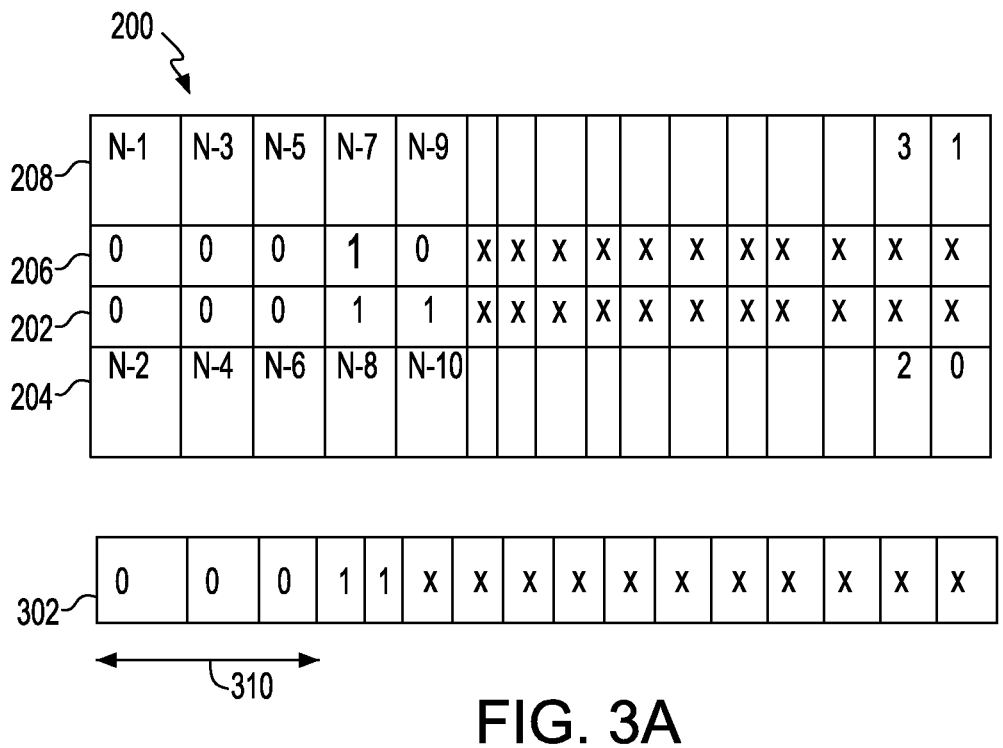
FIGS. 3A-3C are schematic diagrams illustrating a bitwise compression technique utilized to reduce the number of logic levels in the CLZ circuit of FIG. 8, in accordance with an embodiment of the present invention.
Figure 3B:
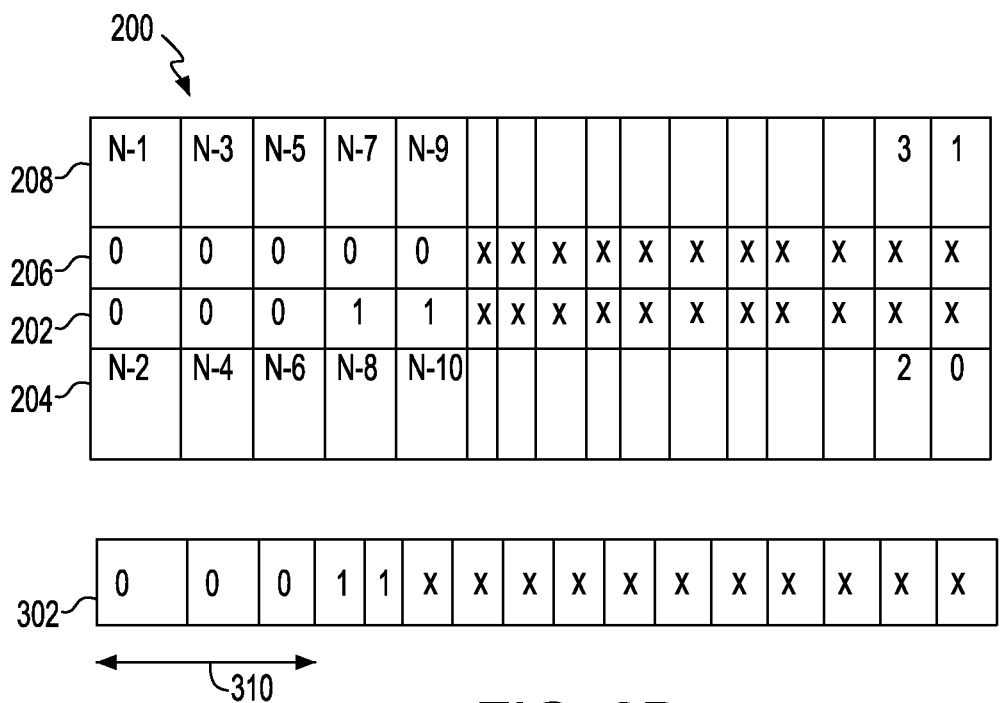
Figure 3C:
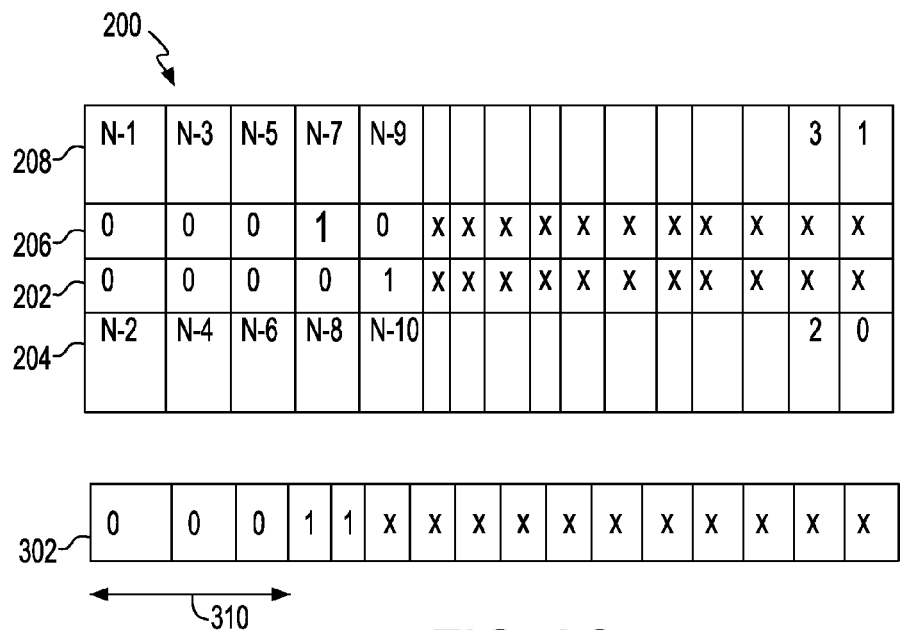
Figure 8:
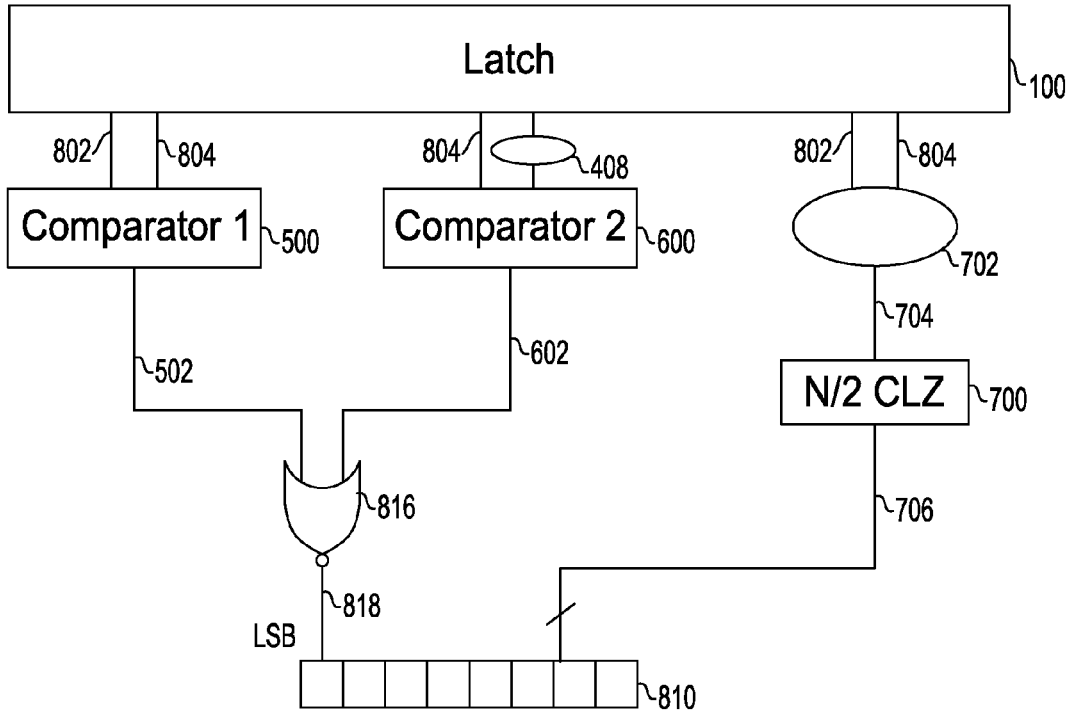
FIG. 8 is a block diagram illustrating the component structure of an embodiment of the present invention.

FIGS. 3A-3C are schematic diagrams illustrating a bitwise compression technique utilized to reduce the number of logic levels in the CLZ circuit of FIG. 8, in accordance with an embodiment of the present invention. In accordance with an embodiment of the present invention, the result of logical OR operation performed on data content contained in the even bit positions and data content contained in the odd bit positions includes the smallest number of leading zeros with respect to even bit positions and odd bit positions. FIG. 3A illustrates a case where the number of leading zeros in the even and odd bit positions are the same. In the example of FIG. 3A, data content 202 contained in the even bit positions 204 and data content 206 contained in the odd bit positions 208 have three leading zeros. Result 302 of logical OR operation contains three leading zeros 310 as well. FIG. 3B illustrates a case where the number of leading zeros in the even bit positions is less than the number of leading zeros in the odd bit positions. In the example of FIG. 3B, data content 202 contained in the even bit positions 204 has three leading zeros, which is smaller than the number of leading zeros in data content 206 contained in the odd bit positions 208. Result 302 of logical OR operation contains three leading zeros 310 as well, which is equal to the smallest number of leading zeros with respect to even and odd bit positions. FIG. 3C illustrates a case where the number of leading zeros in the odd bit positions is less than the number of leading zeros in the even bit positions. In the example of FIG. 3C, data content 206 contained in the odd bit positions 208 has three leading zeros, which is smaller than the number of leading zeros in data content 202 contained in the even bit positions 204. Result 302 of logical OR operation contains three leading zeros 310 as well, which is equal to the smallest number of leading zeros with respect to even and odd bit positions. Therefore, the logical operation illustrated in FIGS. 3A-3C eliminates the need for a separate count of leading zeros in the even and odd bit positions. It should be noted that result 302 should be increased by 1 if even bit positions have smaller number of leading zeros, based on the foregoing discussion in conjunction with FIG. 2E. Therefore, in accordance with an embodiment of the present invention, formula (5) may be reduced to the following formula:

$$\text{Final } CLZ = 2 * CLZ(\text{Odd} \| \text{Even}) + \text{NOT}((\text{Odd} >= \text{Even}) \| ((\text{Odd}^\wedge \text{Even}) < \text{Odd})) \quad (6)$$

Formula (6) may be implemented using logic circuitry discussed below in conjunction with FIGS. 4-9. Such logic circuitry is therefore configured to perform operations to carry out the method aspect of the present invention.

Figure 4:
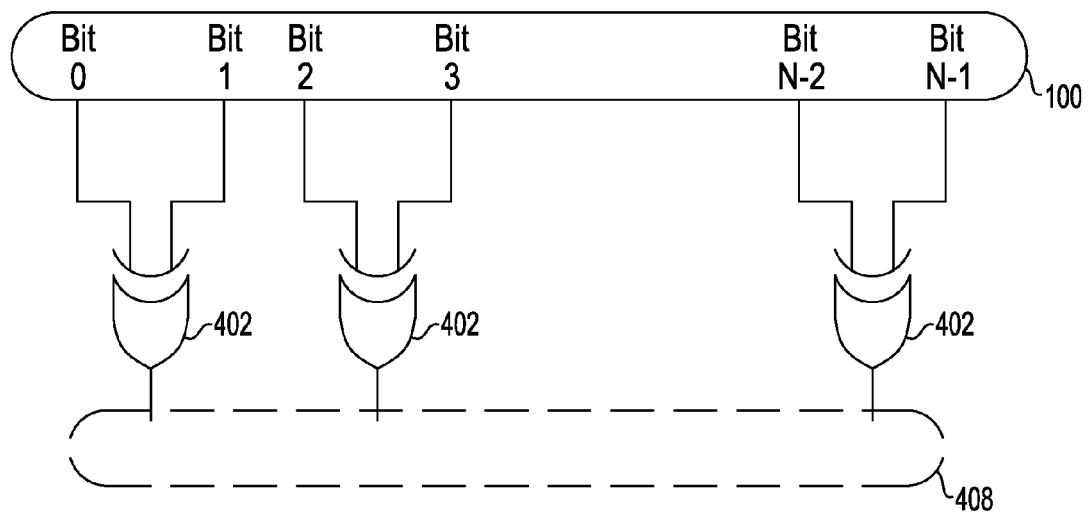
FIG. 4 is a schematic diagram of an exclusive OR (XOR) circuit that provides a result of a first logical operation performed on the input data in the digital data word, in accordance with an embodiment of the present invention.

Referring to FIG. 4, according to an embodiment of the present invention the CLZ circuit (of FIG. 8) includes an XOR circuit. The XOR circuit includes a plurality of XOR gates 402 connected to input data contained in latch 100. Each XOR gate 402 receives a corresponding one odd and even bits of the input data bits. The plurality of XOR gates 402 output data 408 to second comparator 600 of FIG. 6. Broadly speaking, the CLZ circuit of FIG. 8 further includes two comparator circuits.

Figure 5:
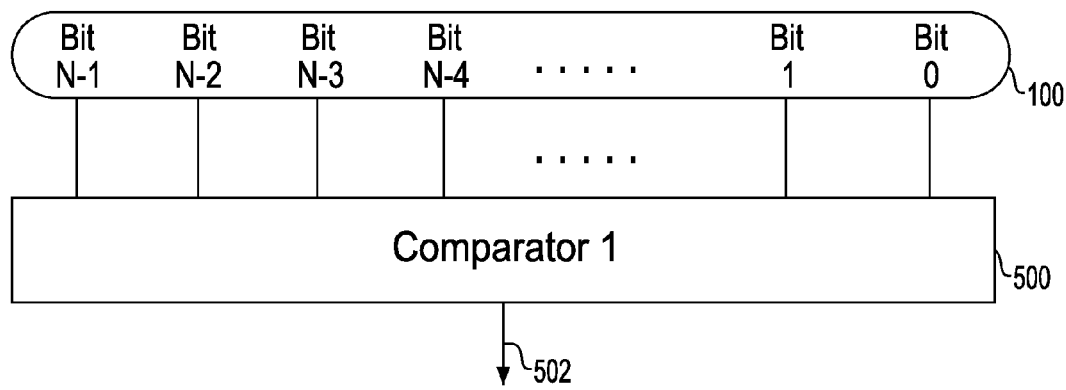
FIG. 5 is a schematic diagram of a first comparator circuit that provides a first determination value, in accordance with an embodiment of the present invention.

A first comparator circuit 500, schematically illustrated in FIG. 5, compares data contained in odd bit positions with data contained in even bit positions of latch 100 to check for a condition in which a logical value of the data contained in the odd bit positions is greater than or equal to a logical value of the data contained in the even bit positions. When this condition is satisfied output (first determination value) 502 is high (logical 1), otherwise output 502 is low (logical 0). Comparator circuit 500 is known in the art and therefore a detailed description is omitted.

Figure 6:
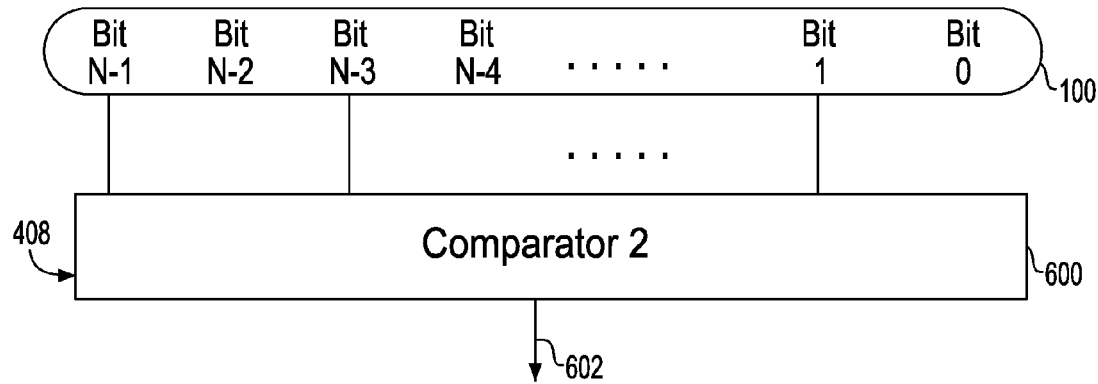
FIG. 6 is a schematic diagram of a second comparator circuit that provides a second determination value, in accordance with an embodiment of the present invention.

A second comparator circuit 600, schematically illustrated in FIG. 6, utilizes XOR circuit output 408 to check for a condition in which the result of logical XOR operation performed on odd and even bits is less than data contained in the odd bit positions of latch 100. When this condition is satisfied output (second determination value) 602 is high, otherwise output 602 is low. Again, a detailed description of comparator circuit 600 is omitted because such circuitry is well-known in the art. Note that any appropriate greater than comparator can be used to implement circuit 600 in FIG. 6.

Figure 7:
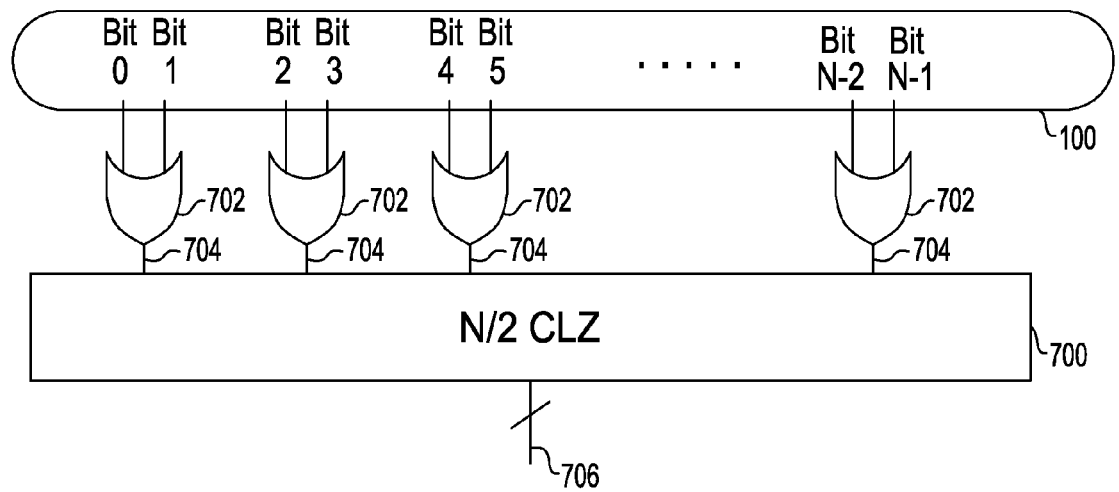
FIG. 7 is a schematic diagram of a count leading zero circuit connected to an output of a second logical operation performed on the input data in the digital data word, in accordance with an embodiment of the present invention.

FIG. 7 is a schematic diagram of a count leading zero circuit receiving transformed data from the latch. Latch 100 is shown as having N bit positions 0 through N−1. Latch 100 is connected, as shown, to a plurality of OR gates 702. The plurality of OR gates 702 are configured to perform a logical OR operation on odd and even bits. Each OR gate 702 receives a corresponding one odd and even bits from latch 100, as shown. The plurality of OR gates 702 output 704 is connected, as shown, to the count leading zeros circuit 700. It should be noted that the plurality of OR gates 702 includes N/2 OR gates 702, each having one output 704. Therefore, the count leading zeros circuit 700 is only using N/2 bits to count leading zeros and a numerical value representing the number of leading zeros is output on line 706. By only having to count half of the latch bit positions, circuitry is saved. There are also savings in area, timing and routing resources. Note that N/2 count leading zeros circuit 700 is known in the art and therefore a detailed description is omitted.

FIG. 8 is a block diagram illustrating the contents of the inventive CLZ circuit. In accordance with an embodiment of the present invention, the inventive CLZ circuit includes first comparator circuit 500 having inputs coupled separately to even bit positions (through line 802) and odd bit positions (through line 804) of latch 100. This first comparator circuit 500 is illustrated in FIG. 5. In accordance with an embodiment of the present invention, the inventive CLZ circuit further includes second comparator circuit 600 having one input coupled to odd bit positions (line 804) of latch 100. The other input of the second comparator circuit 600 is provided by the output 408 of the XOR circuit illustrated in FIG. 4. The second comparator circuit is illustrated in FIG. 6. In accordance with an embodiment of the present invention, the plurality of OR gates 702 are connected to corresponding even bit positions (line 802) and odd bit positions (line 804) of latch 100. The output of the plurality of OR gates 702 is provided on lines 704 to a N/2 count leading zeros circuit 700. The plurality of OR gates 702 and CLZ circuit 700 are illustrated in FIG. 7. The output of the count leading zero circuit 700 is shifted left by one position (to compute 2*CLZ (Odd∥Even) in formula (6)) and provided on line 706. This output consists of bit positions 0 through $\log_2$ (N/2)−1 in parallel where N is the number of bit positions in the data word that is stored in latch 100. Line 706 provides the most significant bit positions of the data to latch 810 for storage. The single bit output of the first comparator 500 is provided on line 502 as an input to NOR gate 816. The single bit output of the second comparator 600 is provided on line 602 as the other input to the NOR gate 816. The NOR gate 816 is providing a single bit output (correction value) on line 818. This single bit constitutes the least significant bit position of the result data stored in latch 810.

Therefore, FIG. 8 illustrates a new way to perform the count leading zeros function for random data by using only a N/2 count leading zeros circuit with a least significant bit correction circuit that includes only 2 comparator circuits and a logic gate. It should be noted that this CLZ circuit does not require any correction in the input data and advantageously reduces the circuitry needed to perform a CLZ operation.

Figure 9:
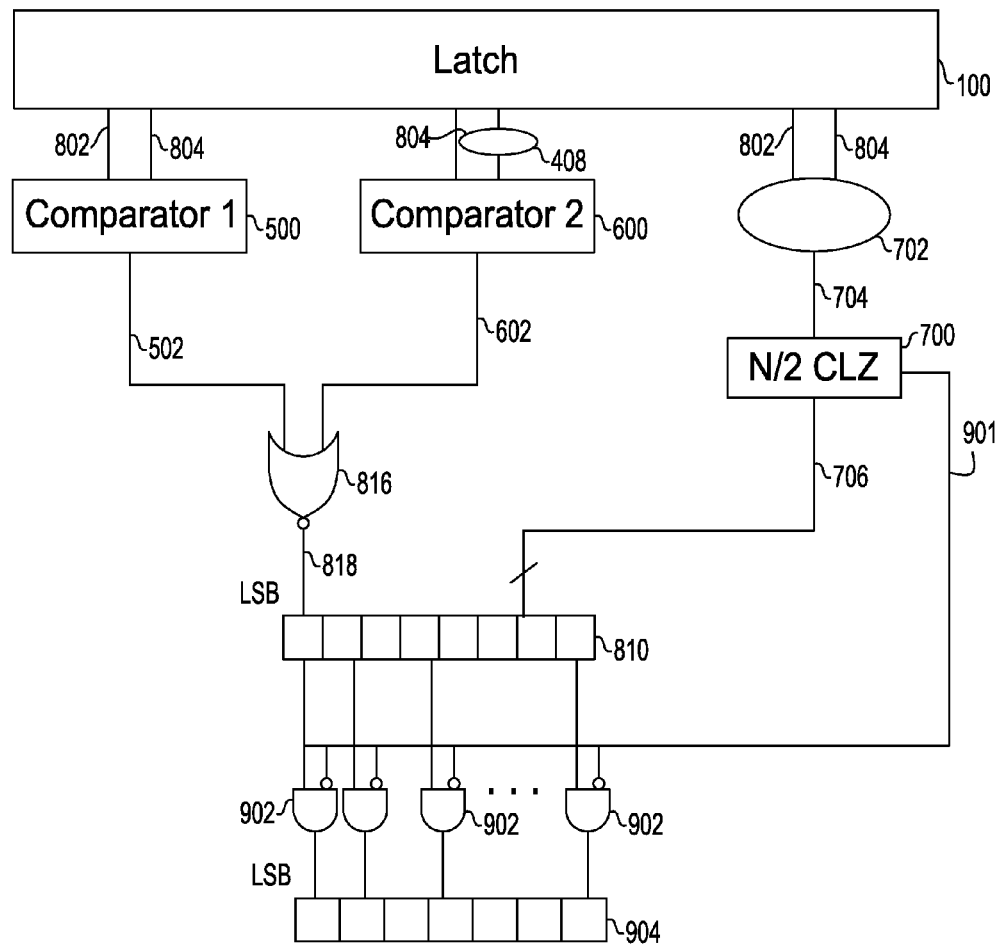
FIG. 9 is a block diagram illustrating the component structure of another embodiment of the present invention.

Referring now to FIG. 9, there is a block diagram illustrating the component structure of another embodiment of the present invention. The inventive CLZ component structure in this embodiment is identical to the component structure in the embodiment shown in FIG. 8 except for additional output from the count leading zero circuit 700 and logical gates that adjust the final result stored in latch 810 based on this additional output. Identical elements are therefore assigned like numbers. It should be understood that in various embodiments various implementations of the count leading zero circuit 700 may produce inconsistent results when input data in latch 100 contains all 0s. For example, some implementations of CLZ circuit 700 may generate an output data consisting of all 0s, while other implementations of CLZ circuit 700 may generate an output consisting of all 1s. Hence, an embodiment illustrated in FIG. 9 provides an additional step of modifying the final result when the input data consists of all 0s. As shown in FIG. 9, CLZ circuit 700 may have an additional determination value—a single bit output (referred to herein as 'Zero') 901. In an embodiment of the present invention, 'Zero' 901 is 1 if input on lines 704 contains all 0s, and 0 otherwise. Further, 'Zero' 901 is an inverted input to each of a plurality of two input logical AND gates 902. The other input (second input) to each of the plurality of AND gates 902 is connected to the consecutive bit positions contents of latch 810, as shown in FIG. 9. While only four gates are shown, the actual number of AND gates 902 would be the number of bits in latch 810. In an embodiment, the number of bits in latch 810 may be equal to $\log_2 N$ bits. The outputs of these AND gates 902 provide all bits of a final adjusted value that may be stored in latch 904. When 'Zero' output 901 receives a logical 0 (i.e. input data on lines 704 contains at least one 1), AND gates 902 operate to pass values provided to their other inputs from corresponding bit positions of latch 810. If 'Zero' output 901 receives a logical 1(i.e. input data on lines 704 contains all 0s), AND gates 902 zero out the values inputted to their respective second inputs.

Therefore, FIG. 9 illustrates another embodiment of a circuit that may perform the count leading zeros function for random data by using only a N/2 count leading zeros circuit. Advantageously, the inventive circuit illustrated in FIG. 9 may produce consistent results for random data and for various implementations of the N/2 count leading zero circuits.

The description above has been presented for illustration purposes only. It is not intended to be an exhaustive description of the possible embodiments. One of ordinary skill in the art will understand that other combinations and embodiments are possible.

What is claimed is:

1. A logic circuit for determining a numerical value representing a number of leading zero count value in a binary input data word, the logic circuit comprising:
   a latch having a binary input data word, the binary data word includes random bits stored in bit positions of the binary input data word, wherein the bit positions include a least significant bit positions and a most significant bit positions and, wherein, the binary input data word is divided into two halves, one half containing odd numbered bits, while the other half contains even numbered bits;
   a first comparator circuit for comparing data in the odd numbered bits of the binary input data word to data in the even numbered bits of the binary input data word;
   a second comparator circuit for comparing the data of the odd numbered bits to a result of a first logical operation performed on the data of the odd numbered bits and the data of the even numbered bits, wherein the comparison is based on a determination of whether the result of the first logical operation is less than the data in the odd numbered bits;
   a leading zero counting circuit for performing a leading zero count on a result of a second logical operation performed on the data of the even numbered bits and the data of the odd numbered bits, wherein, the leading zero counting circuit generates a number of leading zero count value based on the leading zero count; and
   a logic gate configured to calculate a single bit value based upon the outputs of the first comparator circuit and the second comparator circuit, wherein, the logic gate generates a single bit correction value, based on the calculated single bit value, the logic gate concatenates the single bit correction value generated by the logic gate to the number of leading zero count value generated by the leading zero counting circuit to provide the numerical value representing the number of leading zero count value in the binary input data word.

2. The logic circuit of claim 1, wherein the first comparator circuit determines whether the data in the even numbered bits is greater than or equal to the data in the odd numbered bits.

3. The logic circuit of claim 1, wherein the first logical operation comprises an exclusive-OR (XOR) operation.

4. The logic circuit of claim 1, wherein the second comparator circuit determines whether the result of the first logical operation is less than the data in the odd numbered bits.

5. The logic circuit of claim 1, wherein the second logical operation comprises a logical OR operation.

6. The logic circuit of claim 1, wherein the result of the second logical operation comprises another binary input data word, and wherein the binary input data word of the second logical operation comprises an equal to half of the bits of the binary input data word.

7. A method for providing a numerical value representing a number of leading zero count value in a binary data word, the method comprising:
   using a computer, storing the binary data word in a latch having a binary input data word, the binary data word includes random bits stored in bit positions of the binary input data word, wherein the bit positions include a least significant bit positions and a most significant bit positions, wherein, the binary input data word is divided into two halves, one half containing odd numbered bits, while the other half contains even numbered bits;
   using a first comparator circuit for comparing data in the odd numbered bits of the binary input data word to data in the even numbered bits of the binary input data word;
   using a second comparator circuit for comparing the data of the odd numbered bits to a result of a first logical operation performed on the odd numbered bits and the data of the even numbered bits, the comparison is based on a determination of whether the result of the first logical operation is less than the data in the odd numbered bits;
   using a leading zero counting circuit for performing a leading zero count on a result of a second logical operation performed on the data of the even numbered bits and the data of the odd numbered bits, wherein, the leading zero counting circuit generates a number of leading zero count value based on the leading zero count;
   using a logic gate to calculate a single bit value based upon the outputs of the first comparator circuit and the second comparator circuit, wherein the logic gate generating a single correction bit value; and
   concatenating the single correction bit value generated by the logic gate to the number of leading zero count value generated by the leading zero counting circuit to provide the numerical value representing the number of leading zero count value in the binary data word.

8. The method of claim 7, wherein the step of using the first comparator circuit for comparing data in the odd numbered bits of the binary input data word to data in the even numbered bits of the binary input data word further comprises determining whether the data in the even numbered bits is greater than or equal to the data in the odd numbered bits.

9. The method of claim 7, wherein the first logical operation comprises an exclusive-OR (XOR) operation.

10. The method of claim 7, further comprising: the second comparator circuit determining whether the result of the first logical operation is less than the data of the odd numbered bit.

11. The method of claim 7, wherein the second logical operation comprises a logical OR operation.

12. The method of claim 7, wherein the result of the second logical operation comprises another binary input data word, wherein the binary input data word of the second logical operation comprises an equal to half of the bits of the binary input data word.

* * * * *